(12) United States Patent
Perez et al.

(10) Patent No.: US 9,141,193 B2
(45) Date of Patent: Sep. 22, 2015

(54) TECHNIQUES FOR USING HUMAN GESTURES TO CONTROL GESTURE UNAWARE PROGRAMS

(75) Inventors: Kathryn S. Perez, Shoreline, WA (US); Kevin A. Geisner, Mercer Island, WA (US); Alex A. Kipman, Redmond, WA (US); Kudo Tsunoda, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 26 days.

(21) Appl. No.: 12/551,370

(22) Filed: Aug. 31, 2009

(65) Prior Publication Data

US 2011/0055846 A1    Mar. 3, 2011

(51) Int. Cl.
| | | |
|---|---|---|
| G06F 3/033 | (2013.01) | |
| G06F 9/46 | (2006.01) | |
| G06F 3/01 | (2006.01) | |
| G06F 3/038 | (2013.01) | |
| G06F 3/041 | (2006.01) | |
| G06F 3/16 | (2006.01) | |
| G06K 9/00 | (2006.01) | |

(52) U.S. Cl.
CPC .............. G06F 3/017 (2013.01); G06F 3/038 (2013.01); G06F 3/0416 (2013.01); G06F 3/16 (2013.01); G06F 3/167 (2013.01); G06K 9/00355 (2013.01)

(58) Field of Classification Search
USPC ................... 704/243; 715/856, 863; 245/156; 382/103
See application file for complete search history.

(56) References Cited

U.S. PATENT DOCUMENTS

| | | |
|---|---|---|
| 4,627,620 A | 12/1986 | Yang |
| 4,630,910 A | 12/1986 | Ross et al. |
| 4,645,458 A | 2/1987 | Williams |
| 4,695,953 A | 9/1987 | Blair et al. |
| 4,702,475 A | 10/1987 | Elstein et al. |
| 4,711,543 A | 12/1987 | Blair et al. |
| 4,751,642 A | 6/1988 | Silva et al. |
| 4,796,997 A | 1/1989 | Svetkoff et al. |
| 4,809,065 A | 2/1989 | Harris et al. |
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |
| 5,101,444 A | 3/1992 | Wilson et al. |
| 5,148,154 A | 9/1992 | MacKay et al. |
| 5,184,295 A | 2/1993 | Mann |
| 5,229,754 A | 7/1993 | Aoki et al. |
| 5,229,756 A | 7/1993 | Kosugi et al. |

(Continued)

FOREIGN PATENT DOCUMENTS

| | | |
|---|---|---|
| CN | 201254344 B | 6/2010 |
| EP | 0583061 A2 | 2/1994 |

(Continued)

OTHER PUBLICATIONS

Qian et al., "A Gesture-Driven Multi-modal Interactive Dance System", IEEE International Conference on Multimedia and Expo, Taipei, Jun. 2004, 3, 1579-1582.

(Continued)

*Primary Examiner* — Phenuel Salomon
*Assistant Examiner* — Tuan S Nguyen
(74) *Attorney, Agent, or Firm* — Gregg Wisdom; Micky Minhas

(57) ABSTRACT

A capture device can detect gestures made by a user. The gestures can be used to control a gesture unaware program.

19 Claims, 8 Drawing Sheets

(56) References Cited

U.S. PATENT DOCUMENTS

| | | |
|---|---|---|
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson et al. |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,745,116 A | 4/1998 | Pisutha-Arnold |
| 5,875,108 A | 2/1999 | Hoffberg et al. |
| 5,877,803 A | 3/1999 | Wee et al. |
| 5,913,727 A | 6/1999 | Ahdoot |
| 5,933,125 A | 8/1999 | Fernie |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,057,909 A | 5/2000 | Yahav et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng et al. |
| 6,098,458 A | 8/2000 | French et al. |
| 6,100,517 A | 8/2000 | Yahav et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,498,628 B2 | 12/2002 | Iwamura |
| 6,502,515 B2 | 1/2003 | Burckhardt et al. |
| 6,503,195 B1 | 1/2003 | Keller et al. |
| 6,512,838 B1 | 1/2003 | Rafii et al. |
| 6,539,931 B2 | 4/2003 | Trajkovic et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,674,877 B1 | 1/2004 | Jojic et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,771,277 B2 | 8/2004 | Ohba |
| 6,788,809 B1 | 9/2004 | Grzeszczuk et al. |
| 6,801,637 B2 | 10/2004 | Voronka et al. |
| 6,873,723 B1 | 3/2005 | Aucsmith et al. |
| 6,876,496 B2 | 4/2005 | French et al. |
| 6,937,742 B2 | 8/2005 | Roberts et al. |
| 6,950,534 B2 | 9/2005 | Cohen et al. |
| 7,003,134 B1 | 2/2006 | Covell et al. |
| 7,006,236 B2 | 2/2006 | Tomasi et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,177 B2 | 5/2006 | Tomasi et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,113,918 B1 | 9/2006 | Ahmad et al. |
| 7,121,946 B2 | 10/2006 | Paul et al. |
| 7,151,530 B2 | 12/2006 | Roeber et al. |
| 7,170,492 B2 | 1/2007 | Bell |
| 7,184,048 B2 | 2/2007 | Hunter |
| 7,202,898 B1 | 4/2007 | Braun et al. |
| 7,222,078 B2 | 5/2007 | Abelow |
| 7,224,384 B1 | 5/2007 | Iddan et al. |
| 7,227,526 B2 * | 6/2007 | Hildreth et al. ............... 345/156 |
| 7,259,747 B2 | 8/2007 | Bell |
| 7,293,356 B2 | 11/2007 | Sohn et al. |
| 7,308,112 B2 | 12/2007 | Fujimura et al. |
| 7,310,431 B2 | 12/2007 | Gokturk et al. |
| 7,317,836 B2 | 1/2008 | Fujimura et al. |
| 7,340,077 B2 | 3/2008 | Gokturk et al. |
| 7,348,963 B2 | 3/2008 | Bell |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,411,575 B2 | 8/2008 | Hill |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,492,367 B2 | 2/2009 | Mahajan et al. |
| 7,536,032 B2 | 5/2009 | Bell |
| 7,555,142 B2 | 6/2009 | Hildreth et al. |
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |
| 7,590,262 B2 | 9/2009 | Fujimura et al. |
| 7,593,552 B2 | 9/2009 | Higaki et al. |
| 7,598,942 B2 | 10/2009 | Underkoffler et al. |
| 7,607,509 B2 | 10/2009 | Schmiz et al. |
| 7,620,202 B2 | 11/2009 | Fujimura et al. |
| 7,627,139 B2 | 12/2009 | Marks et al. |
| 7,668,340 B2 | 2/2010 | Cohen et al. |
| 7,680,298 B2 | 3/2010 | Roberts et al. |

(56) References Cited

U.S. PATENT DOCUMENTS

| | | | |
|---|---|---|---|
| 7,683,954 B2 | 3/2010 | Ichikawa et al. | |
| 7,684,592 B2 | 3/2010 | Paul et al. | |
| 7,701,439 B2 | 4/2010 | Hillis et al. | |
| 7,702,130 B2 | 4/2010 | Im et al. | |
| 7,704,135 B2 | 4/2010 | Harrison, Jr. | |
| 7,710,391 B2 | 5/2010 | Bell et al. | |
| 7,729,530 B2 | 6/2010 | Antonov et al. | |
| 7,746,345 B2 | 6/2010 | Hunter | |
| 7,760,182 B2 | 7/2010 | Ahmad et al. | |
| 7,809,167 B2 | 10/2010 | Bell | |
| 7,834,846 B1 | 11/2010 | Bell | |
| 7,852,262 B2 | 12/2010 | Namineni et al. | |
| RE42,256 E | 3/2011 | Edwards | |
| 7,898,522 B2 | 3/2011 | Hildreth et al. | |
| 8,035,612 B2 | 10/2011 | Bell et al. | |
| 8,035,614 B2 | 10/2011 | Bell et al. | |
| 8,035,624 B2 | 10/2011 | Bell et al. | |
| 8,072,470 B2 | 12/2011 | Marks | |
| 2004/0193413 A1* | 9/2004 | Wilson et al. | 704/243 |
| 2004/0207597 A1 | 10/2004 | Marks | |
| 2005/0059488 A1 | 3/2005 | Larsen et al. | |
| 2006/0075363 A1 | 4/2006 | Mizoguchi | |
| 2006/0075422 A1 | 4/2006 | Choi et al. | |
| 2006/0188144 A1 | 8/2006 | Sasaki et al. | |
| 2006/0238520 A1 | 10/2006 | Westerman | |
| 2006/0239558 A1 | 10/2006 | Rafii et al. | |
| 2007/0013718 A1 | 1/2007 | Ohba | |
| 2007/0060336 A1 | 3/2007 | Marks et al. | |
| 2007/0098222 A1 | 5/2007 | Porter et al. | |
| 2007/0216894 A1 | 9/2007 | Garcia et al. | |
| 2007/0260984 A1 | 11/2007 | Marks et al. | |
| 2007/0279485 A1 | 12/2007 | Ohba et al. | |
| 2007/0283296 A1 | 12/2007 | Nilsson | |
| 2007/0298882 A1 | 12/2007 | Marks et al. | |
| 2008/0001951 A1 | 1/2008 | Marks et al. | |
| 2008/0016456 A1* | 1/2008 | Friedland et al. | 715/771 |
| 2008/0026838 A1 | 1/2008 | Dunstan et al. | |
| 2008/0062257 A1 | 3/2008 | Corson | |
| 2008/0100620 A1 | 5/2008 | Nagai et al. | |
| 2008/0126937 A1 | 5/2008 | Pachet | |
| 2008/0134102 A1 | 6/2008 | Movold et al. | |
| 2008/0152191 A1 | 6/2008 | Fujimura et al. | |
| 2008/0165141 A1 | 7/2008 | Christie | |
| 2008/0168403 A1 | 7/2008 | Westerman | |
| 2008/0215972 A1 | 9/2008 | Zalewski et al. | |
| 2008/0215973 A1 | 9/2008 | Zalewski et al. | |
| 2008/0252596 A1 | 10/2008 | Bell et al. | |
| 2009/0077504 A1 | 3/2009 | Bell et al. | |
| 2009/0103780 A1* | 4/2009 | Nishihara et al. | 382/103 |
| 2009/0141933 A1 | 6/2009 | Wagg | |
| 2009/0167679 A1 | 7/2009 | Klier et al. | |
| 2009/0215533 A1 | 8/2009 | Zalewski et al. | |
| 2009/0221368 A1 | 9/2009 | Yen et al. | |
| 2010/0125815 A1* | 5/2010 | Wang et al. | 715/856 |

FOREIGN PATENT DOCUMENTS

| | | |
|---|---|---|
| JP | 08044490 A1 | 2/1996 |
| WO | 93/10708 A1 | 6/1993 |
| WO | 97/17598 A1 | 5/1997 |
| WO | WO 99/15863 A1 | 4/1999 |
| WO | 99/44698 A1 | 9/1999 |
| WO | WO 01/59975 A3 | 1/2002 |
| WO | WO 02/082249 A2 | 10/2002 |
| WO | WO 03/001722 A3 | 3/2003 |
| WO | WO 03/046706 A1 | 6/2003 |
| WO | WO 03/073359 A3 | 11/2003 |
| WO | WO 03/054683 A3 | 12/2003 |
| WO | WO 2003/071410 A3 | 3/2004 |
| WO | WO 2009/059065 A1 | 5/2009 |

OTHER PUBLICATIONS

Shivappa et al., "Person Tracking with Audio-Visual Cues Using Iterative Decoding Framework", IEEE Fifth International Conference on Advanced Video and Signal Based Surveillance, AVSS '08, Santa Fe, NM, Sep. 1-3, 2008, 260-267.

Ina Fried, *Microsoft Demos Robotic Receptionist*, Beyond Binary—CNET News, at http://news.cnet.com/8301-13860_3-9999057-56.html, (printed Mar. 31, 2009).

M.R.J. Kohler, *System Architecture and Techniques for Gesture Recognition in Unconstraint Environments*, University of Dortmund, at http://citeseerx.ist.psu.edu/viewdoc/download?doi=10.1.1.34.1914&rep=rep1&type=pdf, (printed Mar. 31, 2009).

Matthias Rauterberg, *From Gesture to Action: Natural User Interfaces*, TU/e Eindhoven University of Technology, at http://www.idemployee.id.tue.nl/g.w.m.rauterberg/publications/Diesrede99.pdf, (printed Mar. 31, 2009).

Unknown, *Innovative Multi-Touch Solutions by Natural User Interface (NUI)*, Natural User Interface, at http://natural-ui.com/solutions/products.html, (printed Mar. 31, 2009).

Von Hardenberg, et al., *Bare-Hand Human-Computer Interaction*, Technische Universitat Berlin, at http://citeseerx.ist.psu.edu/viewdoc/download?doi=10.1.1.23.4541&rep=rep1&type=pdf, (printed Mar. 31, 2009).

Kanade et al., "A Stereo Machine for Video-rate Dense Depth Mapping and Its New Applications", IEEE Computer Society Conference on Computer Vision and Pattern Recognition, 1996, pp. 196-202,The Robotics Institute, Carnegie Mellon University, Pittsburgh, PA.

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Nonrigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "Condensation—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collusion of Real and Virtual Objects in Augmented Reality", Technical Report ECRC-95-02, 1995, European Computer-Industry Research Center GmbH, Munich, Germany.

(56) References Cited

OTHER PUBLICATIONS

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

"Simulation and Training", 1994, Division Incorporated.

* cited by examiner

TECHNIQUES FOR USING HUMAN GESTURES TO CONTROL GESTURE UNAWARE PROGRAMS

BACKGROUND

Computing applications such as computer games, multimedia applications, or the like typically use user input in the form of keyboard and mouse input. Gesture recognition systems are being developed to allow for new ways to control programs. While new applications may take advantage of gestures, users and program developers may also want to use gestures to control legacy programs, e.g., programs that were not coded to handle gesture user input. Accordingly, techniques for controlling legacy programs are desirable.

SUMMARY

An example embodiment of the present disclosure describes a system. In this example, the system includes, but is not limited to a computing environment including a processor coupled to a computer readable storage medium, the computer readable storage medium including executable instructions for a program, wherein a user interface for the program is configured to only receive non-gesture user interface commands; a capture device coupled to the computing environment, wherein the capture device is configured to capture images and identify gestures in the images, wherein the capture device is configured to capture audio and identify audio commands in the captured audio; and wherein the non-gesture user interface commands used to control the user interface of the program are generated from gestures identified in the images and audio commands identified in the captured audio. In addition to the foregoing, other aspects are described in the claims, drawings, and text forming a part of the present disclosure.

An example embodiment of the present disclosure describes a method. In this example, the method includes, but is not limited to identifying a gesture from an image captured by a camera; generating a command for a tactile based user input device based on the identified gesture; and sending the command to a gesture unaware program configured to process the command. In addition to the foregoing, other aspects are described in the claims, drawings, and text forming a part of the present disclosure.

An example embodiment of the present disclosure describes a method. In this example, the method includes, but is not limited to receiving image data from a camera; identifying a gesture from the image data; generating a command for a tactile based user input device based on the identified gesture; and sending the command to a computing environment coupled to the device. In addition to the foregoing, other aspects are described in the claims, drawings, and text forming a part of the present disclosure.

It can be appreciated by one of skill in the art that one or more various aspects of the disclosure may include but are not limited to circuitry and/or programming for effecting the herein-referenced aspects of the present disclosure; the circuitry and/or programming can be virtually any combination of hardware, software, and/or firmware configured to effect the herein-referenced aspects depending upon the design choices of the system designer.

The foregoing is a summary and thus contains, by necessity, simplifications, generalizations and omissions of detail.

Those skilled in the art will appreciate that the summary is illustrative only and is not intended to be in any way limiting.

DETAILED DESCRIPTION

Figure 1:
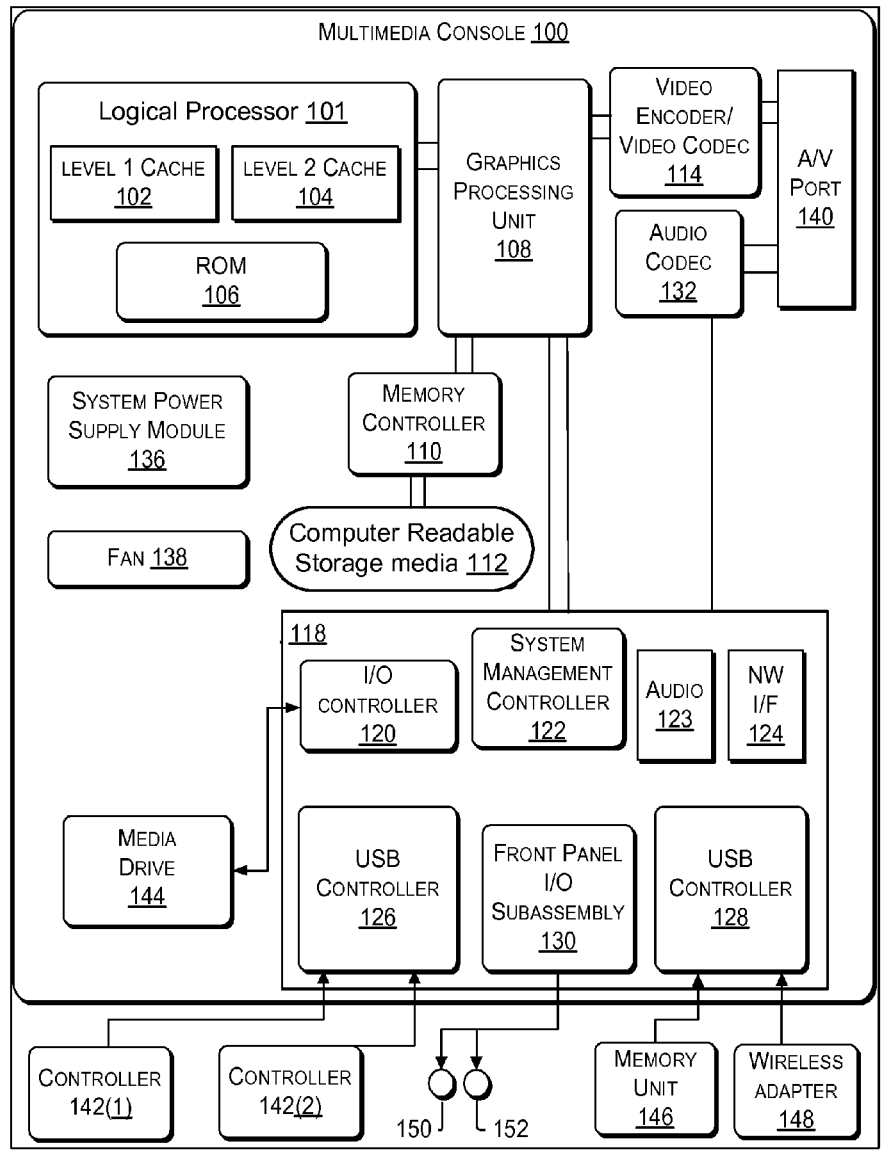
FIG. 1 depicts an example multimedia console.
Figure 2:
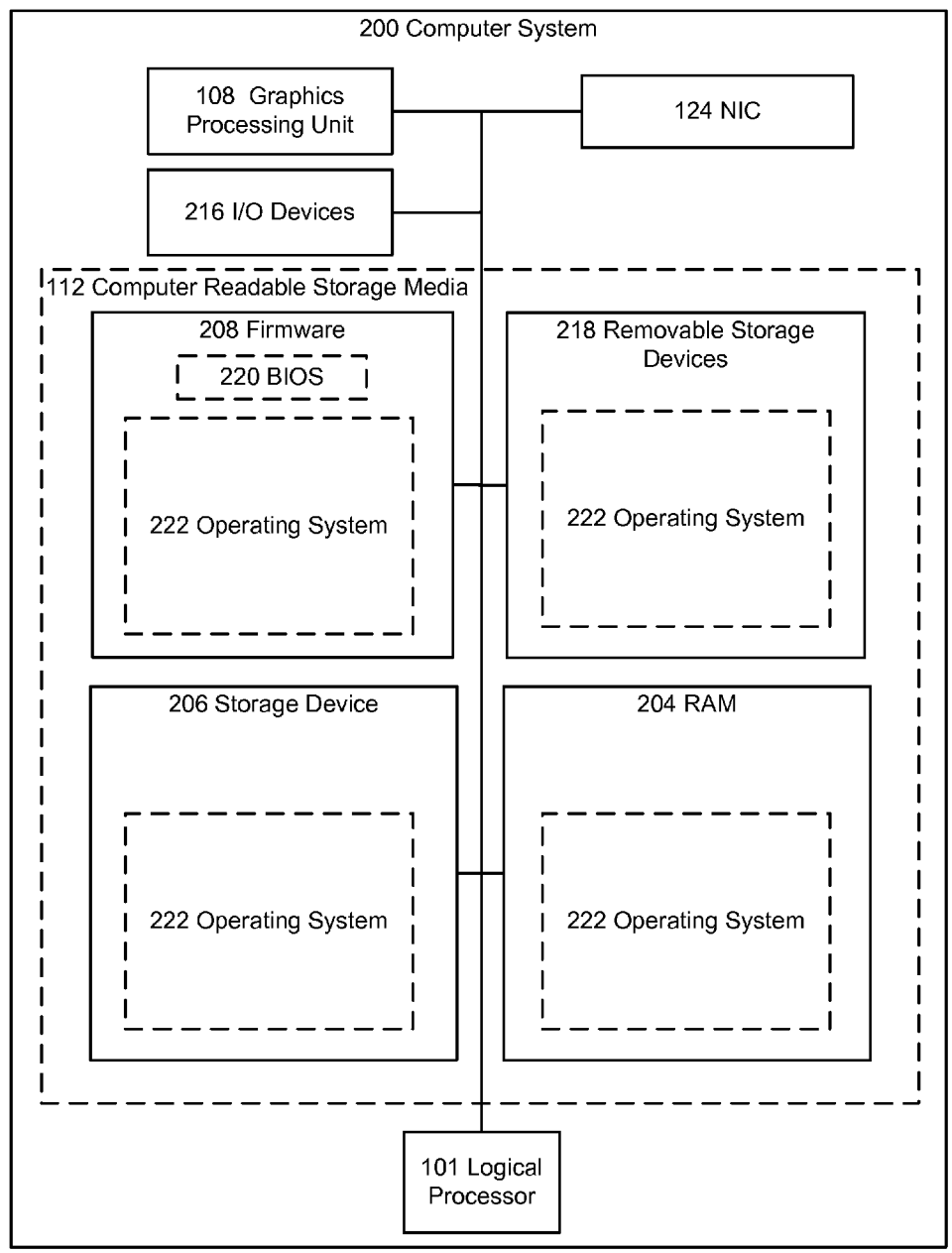
FIG. 2 depicts an example computer system.

FIGS. 1 and 2 illustrate example computing environments in which the disclosure may be implemented. One skilled in the art can appreciate that a computing environment can have some or all of the components described with respect to multimedia console 100 of FIG. 1 and computer system 200 of FIG. 2.

The term circuitry used throughout the disclosure can include hardware components such as application-specific integrated circuits (ASICS), hardware interrupt controllers, hard drives, network adaptors, graphics processors, hardware based video/audio codecs, alone or in combination with the firmware/software used to operate such hardware. The term circuitry can also include microprocessors configured to perform function(s) by firmware, by switches, and/or one or more logical processors, e.g., one or more cores of a multi-core general processing unit. The logical processor(s) and the like can be configured by software instructions embodying logic operable to perform function(s) that are loaded from memory, e.g., RAM, ROM, firmware, etc. In example embodiments where circuitry includes a combination of hardware and software an implementer may write source code embodying logic that is subsequently compiled into machine executable code that can be executed by a logical processor, a microprocessor, or the like. Since one skilled in the art can appreciate that the state of the art has evolved to a point where there is little difference between hardware, software, or a combination of hardware/software, the selection of hardware versus software to effectuate functions is merely a design choice. Thus, since one of skill in the art can appreciate that a software process can be transformed into an equivalent hardware structure, and a hardware structure can itself be transformed into an equivalent software process, the selection of a hardware implementation versus a software implementation is left to an implementer.

FIG. 1 illustrates an example embodiment of an computing environment that can be used in embodiments of the present disclosure. As shown in FIG. 1, the computing environment can be multimedia console 100 which can have a logical processor 101 including a level 1 cache 102, a level 2 cache 104, and flash ROM (Read Only Memory) 106. In other non depicted embodiments the multimedia console can have an ASIC or a microprocessor. The level 1 cache 102 and a level 2 cache 104 can temporarily store data and hence reduce the number of memory access cycles, thereby improving processing speed and throughput. The logical processor 101 may include more than one core, e.g., multiple execution cores per processor substrate and/or multiple processor substrates that could each have multiple execution cores. The flash ROM 106 may store executable code that is loaded during an initial phase of a boot process when the multimedia console 100 is powered ON.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of computer readable storage media 112, such as, but not limited to, a RAM (Random Access Memory).

The multimedia console 100 can include an I/O controller 120, a system management controller 122, an audio processing unit 123, a network interface controller 124, a first USB host controller 126, a second USB controller 128 and a front panel I/O subassembly 130 that are preferably implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface 124 and/or wireless adapter 148 provide access to a network (e.g., the Internet, home network, etc.) and may be any of a wide variety of various wired or wireless adapter components including an Ethernet card, a modem, a Bluetooth module, a cable modem, and the like.

A media drive 144 is provided and may comprise a DVD/CD drive, hard drive, or other removable media drive, etc. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection (e.g., IEEE 1394).

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The logical processor 101, GPU 108, memory controller 110, and various other components within the multimedia console 100 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 100 is powered ON, application data, and/or a system user interface may be loaded from computer readable storage media 112 into RAM and/or caches 102, 104 and executed by the logical processor 101. The system user interface can present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 may further be operated as a participant in a larger network community.

When the multimedia console 100 is powered ON, a set amount of hardware resources are reserved for system use by the multimedia console operating system. These resources may include a reservation of memory (e.g., 16MB), CPU and GPU cycles (e.g., 5%), networking bandwidth (e.g., 8 kbs), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., popups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resynch is eliminated.

After the multimedia console 100 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the logical processor 101 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 142(1) and 142(2)) are shared by gaming applications and system applications. The input devices are not reserved resources, but are to be switched between system applications and the gaming application such that each will have a focus of the device. The application manager preferably controls the switching of input stream, without knowledge the gaming application's knowledge and a driver maintains state information regarding focus switches.

Referring now to FIG. 2, an exemplary computer system 200 is depicted. Computer system 200 can include a logical processor 101, e.g., one or more execution cores. As shown by the figure, various computer readable storage media 112 can be interconnected by a system bus which couples various system components to the logical processor 101. The system bus may be any of several types of bus structures including a memory bus or memory controller, a peripheral bus, and a local bus using any of a variety of bus architectures. In example embodiments the computer readable storage media 101 can include for example, random access memory (RAM) 204, storage device 206, e.g., electromechanical hard drive, solid state hard drive, etc., firmware 208, e.g., FLASH RAM or ROM, and removable storage devices 218 such as, for example, CD-ROMs, floppy disks, DVDs, FLASH drives, external storage devices, etc. It should be appreciated by those skilled in the art that other types of computer readable storage media can be used to store data, such as magnetic cassettes, flash memory cards, digital video disks, Bernoulli cartridges, etc.

The computer readable storage media 112 can store computer readable instructions, data structures, program modules and other data for the computer 200. A basic input/output system (BIOS) 220, containing the basic routines that help to transfer information between elements within the computer system 200, such as during start up, can be stored in firmware 208. A number of applications and an operating system 222 may be stored on firmware 208, storage device 206, RAM 204, and/or removable storage devices 218, and executed by logical processor 202.

Figure 3:
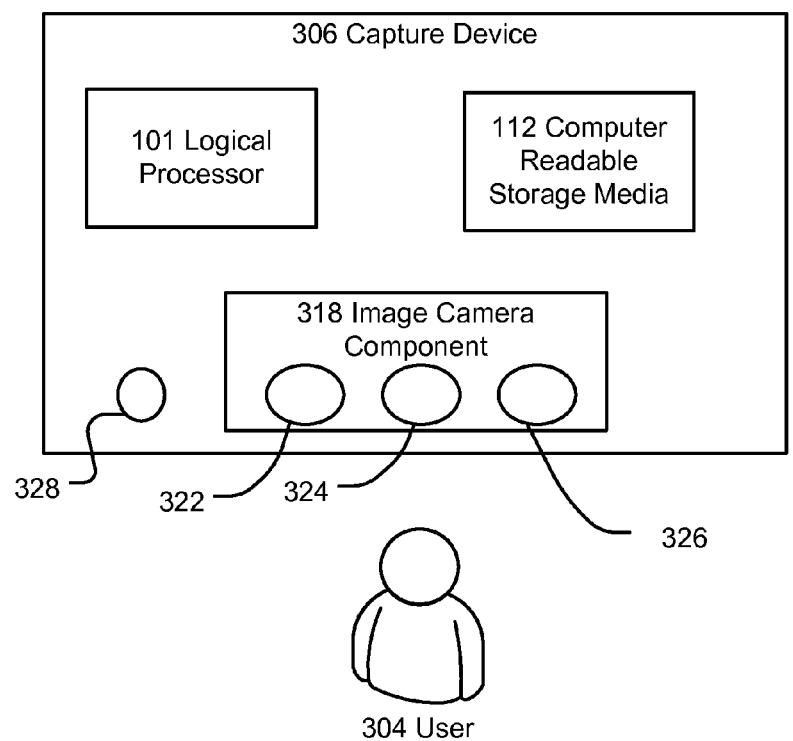
FIG. 3 illustrates an example capture device.

Commands and information may be received by computer 200 through input devices 216 which can include, but are not limited to, keyboards and pointing devices, joysticks, and/or the capture device 306 of FIG. 3. Other input devices may include microphones, scanners, or the like. These and other input devices are often connected to the logical processor 202 through a serial port interface that is coupled to the system bus, but may be connected by other interfaces, such as a parallel port, game port or universal serial bus (USB). A display or other type of display device can also be connected to the system bus via an interface, such as a video adapter which can be part of, or connected to, a graphics processing unit 108. In addition to the display, computers typically include other peripheral output devices (not shown), such as speakers and printers. The exemplary system of FIG. 1 can also include a host adapter, Small Computer System Interface (SCSI) bus, and an external storage device connected to the SCSI bus.

Computer system 200 may operate in a networked environment using logical connections to one or more remote computers, such as a remote computer. The remote computer may be another computer, a server, a router, a network PC, a peer device or other common network node, and typically can include many or all of the elements described above relative to computer system 200.

When used in a LAN or WAN networking environment, computer system 100 can be connected to the LAN or WAN through a network interface card 124 (NIC). The NIC 214, which may be internal or external, can be connected to the system bus. In a networked environment, program modules depicted relative to the computer system 100, or portions thereof, may be stored in the remote memory storage device. It will be appreciated that the network connections described here are exemplary and other means of establishing a communications link between the computers may be used. Moreover, while it is envisioned that numerous embodiments of the present disclosure are particularly well-suited for computerized systems, nothing in this document is intended to limit the disclosure to such embodiments.

The computing environments depicted by FIG. 1 and FIG. 2 can be connected to an audiovisual devices such as televisions, monitors, high-definition televisions (HDTV), or the like. For example, a computing environment may include a video adapter such as a graphics card and/or an audio adapter such as a sound card that may provide audiovisual signals associated with the game application, non-game application, or the like. The audiovisual device may receive the audiovisual signals from the computing environment and may then output the game or application visuals and/or audio associated with the audiovisual signals. According to one embodiment, the audiovisual device may be connected to the computing environment via, for example, an S-Video cable, a coaxial cable, an HDMI cable, a DVI cable, a VGA cable, or the like.

Turning to FIG. 3, it illustrates an example capture device 306 that can capture an image of a user 304. Capture device 306 can be configured to capture video with depth information including a depth image that may include depth values via any suitable technique including, for example, time-of-flight, structured light, stereo image, or the like. According to one embodiment, the capture device 306 may organize the depth information into "Z layers," or layers that may be perpendicular to a Z axis extending from the depth camera along its line of sight.

As shown in FIG. 3, the capture device 306 may include an image camera component 318 including, for example, a charged coupled device array. According to an example embodiment, the image camera component 318 may be a depth camera that may capture the depth image of a scene. The depth image may include a two-dimensional (2-D) pixel area of the captured scene where each pixel in the 2-D pixel area may represent a depth value such as a length or distance in, for example, centimeters, millimeters, or the like of an object in the captured scene from the camera.

The image camera component 318 may include an IR light component 320, a three-dimensional (3-D) camera 322, and/or an RGB camera 324 that may be used to capture the depth image of a scene. For example, in time-of-flight analysis, the IR light component 320 of the capture device 306 may emit an infrared light onto the scene and may then use sensors (not shown) to detect the backscattered light from the surface of one or more targets and objects in the scene using, for example, the 3-D camera 322 and/or the RGB camera 324. In some embodiments, pulsed infrared light may be used such that the time between an outgoing light pulse and a corresponding incoming light pulse may be measured and used to determine a physical distance from the capture device 306 to a particular location on the targets or objects in the scene. Additionally, in other example embodiments, the phase of the outgoing light wave may be compared to the phase of the incoming light wave to determine a phase shift. The phase shift may then be used to determine a physical distance from the capture device to a particular location on the targets or objects.

According to another example embodiment, time-of-flight analysis may be used to indirectly determine a physical distance from the capture device 306 to a particular location on the targets or objects by analyzing the intensity of the reflected beam of light over time via various techniques including, for example, shuttered light pulse imaging.

In another example embodiment, the capture device 306 may use structured light to capture depth information. In such an analysis, patterned light (i.e., light displayed as a known pattern such as grid pattern or a stripe pattern) may be projected onto the scene via, for example, the IR light component 320. Upon striking the surface of one or more targets or objects in the scene, the pattern may become deformed in response. Such a deformation of the pattern may be captured by, for example, the 3-D camera 322 and/or the RGB camera 324 and may then be analyzed to determine a physical distance from the capture device to a particular location on the targets or objects.

According to another embodiment, the capture device 306 may include two or more physically separated cameras that may view a scene from different angles to obtain visual stereo data that may be resolved to generate depth information.

The capture device 306 may further include a microphone 326. The microphone 326 may include a transducer or sensor that may receive and convert sound into an electrical signal. According to one embodiment, the microphone 326 may be used to reduce feedback between the capture device 306 and an attacked computer system. Additionally, the microphone 326 may be used to receive audio signals that may also be provided by the user to control gesture unaware programs such as game programs, non-game applications, or the like.

In an example embodiment the capture device 306 may further include a logical processor (or other circuitry such as an application specific integrated circuit) that may be in operative communication with the image camera component 318. The capture device 306 may further include computer readable storage media 112 that may store the instructions that may be executed by the processor 101, images or frames of images captured by the 3-D camera 322 or RGB camera 324, or any other suitable information, images, or the like. Similar to that described above, the computer readable storage media 112 may include random access memory (RAM), read only memory (ROM), cache, Flash memory, a hard disk, or any other suitable storage component. In an embodiment, the computer readable storage media 112 may be a separate component in communication with the image capture component 318 and a logical processor 101. According to another embodiment, the computer readable storage media may be integrated into the processor and/or the image capture component 318.

The capture device 306 can be configured to obtain image data such as an image or frame of a scene captured by, for example, the 3-D camera 322 and/or the RGB camera 324 of the capture device 306. In an example embodiment the image data may include a human target and one or more non-human targets such as a wall, a table, a monitor, or the like in the captured scene. The image data may include a plurality of observed pixels where each observed pixel has an observed depth value associated therewith. For example, the image data may include a two-dimensional (2-D) pixel area of the captured scene where each pixel in the 2-D pixel area may represent a depth value such as a length or distance in, for example, centimeters, millimeters, or the like of a target or object in the captured scene from the capture device. In one example embodiment, the image data may be colorized such that different colors of the pixels of the depth image correspond to different distances of the human target and non-human targets from the capture device. For example, according to one embodiment, the pixels associated with a target closest to the capture device may be colored with shades of red and/or orange in the image data whereas the pixels associated with a target further away may be colored with shades of green and/or blue in the depth image.

Additionally, as described above, the capture device may organize the calculated depth information including the depth image into "Z layers," or layers that may be perpendicular to a Z axis extending from the camera along its line of sight to the viewer. The likely Z values of the Z layers may be flood filled based on the determined edges. For example, the pixels associated with the determined edges and the pixels of the area within the determined edges may be associated with each other to define a target or an object in the scene that may be compared with a pattern.

Figure 4:
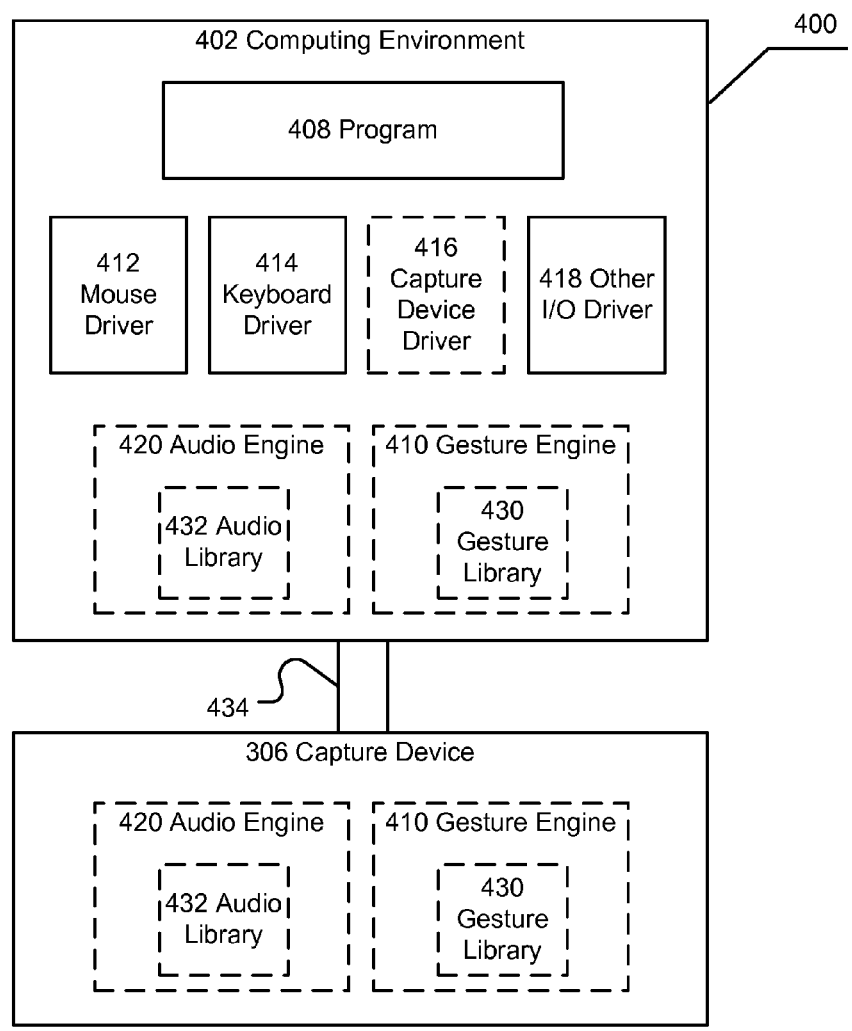
FIG. 4 illustrates an example embodiment of a configuration of a target recognition, analysis, and tracking system.

In an embodiment, the image data can be used to create for example, a model which can be used by a gesture engine 410 of FIG. 4 to determine if the user performed a gesture. In this example gesture engine 410 may determine whether a received depth image includes a human target corresponding to, for example, a user such as the user 304, by flood filling each target or object in the image data and comparing each flood filled target or object to a pattern associated with a body model of a human in various positions or poses. The flood filled target or object that matches the pattern may then be isolated and scanned by circuitry to determine values including, for example, measurements of various body parts. According to an example embodiment, a model such as a skeletal model, a mesh model, or the like may then be generated based on the scan. For example, according to one embodiment, measurement values that may be determined by the scan may be stored in one or more data structures that may be used to define one or more joints in a model. The one or more nodes may be used to define one or more bones that may correspond to a body part of a human.

The model may include one or more data structures that may represent, for example, a human target as a three-dimensional model. Each body part may be characterized as a mathematical vector defining nodes and interconnects of the model. The model may include one or more nodes that can define the interconnect between body parts. For example, a model representing a human target may include a plurality of rigid and/or deformable body parts that may be defined by one or more structural members such as "bones" with the nodes located at the intersection of adjacent bones. The nodes may enable various body parts associated with the bones and nodes to move independently of each other. Each of the body parts may be characterized as a mathematical vector having a X value, a Y value, and a Z value defining the joints and bones.

Turning now to FIG. 4, it shows a target recognition, analysis, and tracking system 400 that can use images of the user 304 and sounds to control a gesture unaware program. Generally the target recognition, analysis, and tracking system 400 includes a computing environment 402 such as multimedia console 100, computer system 200, or the like coupled to capture device 306 via a link 434, e.g., a USB connection, a Firewire connection, an Ethernet cable connection, or the like and/or a wireless connection such as a wireless 802.11b, g, a, or n connection.

For example, the target recognition, analysis, and tracking system 400 can determine if user 304 makes a gesture or an audio command and use the gesture or audio command to control a program 408. For example, a gesture comprises a motion or pose by a user that may be captured as image data and parsed for meaning A gesture may be dynamic, comprising a motion, such as mimicking throwing a ball. A gesture may be a static pose, such as holding one's crossed forearms in front of his torso. A gesture may also incorporate props, such as by swinging a mock sword. A gesture may comprise more than one body part, such as clapping the hands together, or a subtler motion, such as pursing one's lips. A user may generate a gesture that corresponds to walking or running, by walking or running in place. The user may alternately lift and drop each leg to mimic walking without moving.

In an embodiment the program 408 can be gesture unaware. That is, in the program 408 may not include a gesture interface, i.e., the program may instead include instructions configured to process and use tactile based (input relying on touch) user input or audio commands. The program 408 can be any type of program such as operating system, word processor, videogame, etc. In an embodiment where program 408 is an operating system, the operating system can include input output drivers such as mouse drivers 412, keyboard drivers 414, optionally a capture device driver 416, and other I/O drivers 418 such as, for example, touch screen drivers, voice command drivers, videogame controller drivers, or any other human interface device drivers. In an embodiment where program is 408 an application such as a web-browser, a word processor, a picture editing program, etc, program 408 can include executable instructions that request one or more threads to handle and process user input. In this example program 408 may rely on mouse drivers 414, keyboard drivers 414, and other I/O drivers 418 installed on the operating system and OS code to supply it with user interface messages.

Generally, a mouse driver 412 can process packets sent by various mice and send mouse event messages to a program's input queue. An example mouse may include optical sensors which detect light reflected of a surface and send the image to a digital signal processor. A digital signal processor processes the images and determines how far the mouse moved relative to its last position. The information is encoded in a packet along with any mouse click information and sent to the driver 412. An example mouse data packet could be 3 bytes and is sent when the state of the mouse changes, e.g., it moves or a key is pressed. When the computer system receives the packet an interrupt is raised and the mouse driver 412 is executed. The driver 412 parses the packet and determines what change to the mouse's state has occurred. The mouse driver 412 then generates a message and updates the position of a bitmap called the mouse cursor. If the input is within an active window of a program and a key is pressed the mouse driver 412 can generate a mouse message indicative of the key press and send the message to the input queue of the program.

The keyboard driver 414 receives scancodes from a keyboard. For example, each key on a keyboard can be assigned a unique value called a scancode which is a device-dependent identifier for the key on the keyboard. A keyboard may generate two scancodes when the user types a key: one when the user presses the key and another when the user releases the key. The keyboard driver 414 can interpret a scancode, create a message that includes the scancode and/or other information about the keystroke, and sends the message to an appropriate thread.

The capture device driver 416 may be installed in embodiments in order to communicate with and enable certain functionality of the capture device 306. In an example embodiment however the capture device 306 can emulate a peripheral such as a mouse or keyboard and can operate without a specific capture device driver 416 being installed on the computing environment 402.

Other I/O device drivers 418 can work similarly to mouse and keyboard drivers 412 and 414. For example, devices like videogame controllers can detect when buttons are pressed or analog controls are manipulated and packets of information can be sent to the computer system. Device specific drivers can run and send messages to the programs that are registered to use the input. In another example speech recognition drivers can parse audio to discover audio commands and use the commands to control programs that are registered to use the input.

Shown by FIG. 4 is an audio engine 420 that can be used to parse audio received by the microphone 326. For example, the audio engine 420 can receive an audio stream captured by the microphone 326 and parse it into segments. As shown by the figure the gesture engine 420 is indicated in dashed lines which means it may be a part of the computing environment 402 and/or the capture device 306. The audio engine 420 can compare the segments to a library of audio 432 filters to determine whether anything in a given segment is an audio command. For example, various techniques used to process the segments can be used such as a pattern matching algorithm or the like.

Once the audio engine 420 determines that the user has spoken an audio command the audio command can be used to control a gesture unaware program. In this example the audio command can be used to generate commands for peripheral devices that the program 408 can handle input from. If the program 408 can receive mouse input, then the audio commands can be translated into mouse commands. If the program 408 is coded to receive videogame controller input, then the audio commands can be translated into videogame controller input.

For example the audio libraries can be used to generate peripheral commands so that a gesture unaware program can be controlled. An audio library 432 for an unaware program can include information that defines how various I/O devices communicate to drivers. In this example embodiment the audio library 432 can emulate one or more peripheral devices such as mice, keyboards, etc., by communicating with drivers in a way that a peripheral device would.

FIG. 4 also shows a gesture engine 410 configured to process images captured by the capture device 306 and generate image data which can be used to control gesture unaware programs. As shown by the figure the gesture engine 410 is indicated in dashed lines which means it may be a part of the computing environment 402 and/or the capture device 306. For example, part of the gesture engine 410 may run on the capture device 306 and part may run on the computing environment 402. For example, processing of images can be performed on the capture device 306 or in another embodiment the raw image data of depth and color (where the depth camera comprises a 3D camera) values can be transmitted to the computing environment via link 434 and processed by the computing environment 402. In another embodiment, the processing is performed by the capture device 306 and then the parsed image data is sent to the computing environment 402. In still another embodiment, both the raw image data and the parsed image data can be sent to the computing environment 402.

The parsed image data can then filtered by the gesture engine 410 to determine if a gesture was performed. For example, the gesture engine 410 can include a gesture library 430 including at least one filter. A filter can include information defining the basic movements of the gesture (i.e., base gesture) plus parameters, or metadata for that gesture (hereinafter, the term "filter" may be referred to as a "filter gesture" or simply a "gesture"). For instance, a throw, which comprises motion of one of the hands from behind the rear of the body to past the front of the body, may be implemented as a gesture comprising information representing the movement of one of the hands of the user from behind the rear of the body to past the front of the body, as that movement would be captured by the depth camera. Parameters may then be set for that gesture. Where the gesture is a throw, a parameter may be a threshold velocity that the hand has to reach, a distance the hand must travel (either absolute, or relative to the size of the user as a whole), and a confidence rating by the recognizer engine that the gesture occurred. These parameters for the gesture may vary between programs, between contexts of a single program, or within one context of one program over time. The information defining the gesture and the parameters for that gesture together make up the filter for that gesture. The filters can be mapped to commands for the various programs. A specific example may include a filter for a gesture that includes a user crossing both arms in font of his or her chest that is mapped to a "ctrl+alt+delete" key sequence.

The gesture library 430 can be loaded at runtime based on the type of program(s) in memory. Generally, a gesture library can be a group of related gesture filters that can be loaded based on the types of programs in active memory. For example, if a gesture unaware program and a gesture aware program are active, the gesture engine 410 may have two different libraries in RAM. The gesture engine 410 can switch libraries depending on what program currently has the focus, e.g., is the active window, by receiving a message from the operating system 222. While the gesture engine 410 can have multiple libraries active at one time, unaware programs can use a standardized library in certain embodiments. Thus, gestures used to control a user interface of an operating system may be the same gestures used to control a word processing program. In a specific example gestures could be mapped to left or right mouse clicks, double clicks, copy, paste, open, close, mouse movement, keyboard keys, etc.

In order to determine whether a user executed a gesture the gesture engine 410 can compare the model to a variety of filters in a given library. For example, there can be a variety of outputs that may be associated with the gesture such as a baseline "yes or no" as to whether a gesture is occurring. There also may be a confidence level, which corresponds to the likelihood that the user's tracked movement corresponds to the gesture. This could be a linear scale that ranges over floating point numbers between 0 and 1, inclusive. Tolerance levels can be set such that the gesture engine 410 may use only those recognized gestures that have a high confidence level, such as at least 0.95. Where the gesture engine 410 is configured to recognize every instance of the gesture, even at the cost of false-positives, it may use gestures that have at least a much lower confidence level, such as those merely greater than 0.2.

Once the gesture engine 410 determines that the user has performed a gesture the gesture can be used to control a gesture unaware program. In this example the gestures can be used to generate commands for peripheral devices that the program 408 can handle input from. If the program 408 can receive mouse input, then the gesture commands can be translated into mouse commands. If the program 408 is coded to receive videogame controller input, then the gesture commands can be translated into videogame controller input.

For example the gesture libraries can be used to generate peripheral commands so that a gesture unaware program can be controlled. A gesture library 430 for an unaware program can include information that defines how various I/O devices communicate to drivers. In this example embodiment the gesture library 430 can emulate one or more peripheral devices such as mice, keyboards, etc., by communicating with drivers in a way that a peripheral device would.

The following are a series of flowcharts depicting operational procedures. For ease of understanding, the flowcharts are organized such that the initial flowcharts present implementations via an overall "big picture" viewpoint and subsequent flowcharts provide further additions and/or details. Furthermore, one of skill in the art can appreciate that the operational procedure depicted by dashed lines are considered optional.

Figure 5:
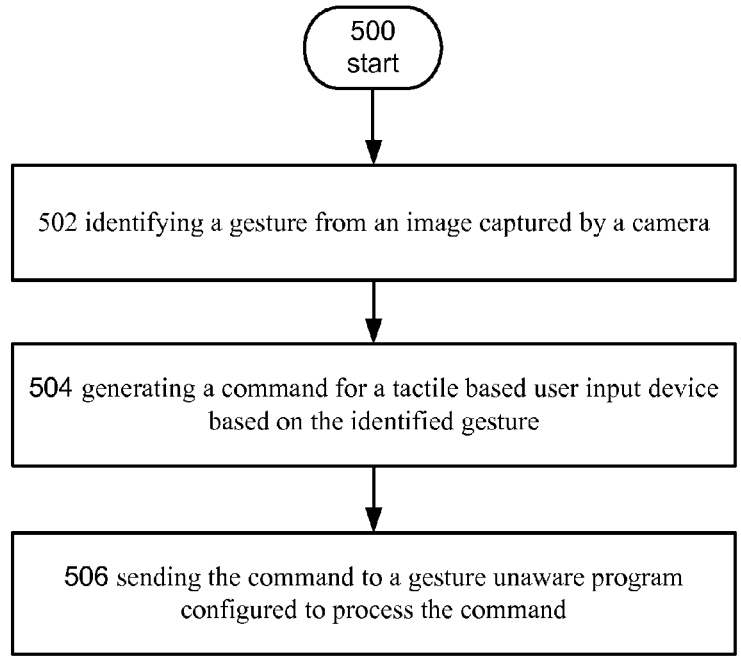
FIG. 5 depicts an operational procedure for practicing aspects of the present disclosure.

Turning now to FIG. 5, it illustrates an operational procedure for practicing aspects of the present disclosure including operations 500-506. Operation 500 begins the operational procedure and operation 502 depicts identifying a gesture from an image captured by a camera. In an example embodiment a computer readable storage media 112 can store executable instructions for a gesture engine 410 of FIG. 4. In this example the computer readable storage media 112 can be a part of computing environment 402, however in other embodiments the computer readable storage media 112 could be a part of capture device 306. The gesture engine 410 can execute and parse an image that was captured by an image camera component 318 to determine that the image includes a gesture using techniques described above with respect to FIG. 4.

In a specific example a user may move his or her right arm to the right which can be indicative of scrolling the mouse in the right direction. The capture device 306 can capture multiple images and the gesture engine 410 can generate a model. The model can be compared to various filters in the gesture library 430. A gesture in the library 430 can be matched to the model.

Continuing with the description of FIG. 4, operation 504 shows generating a command for a tactile based user input device based on the identified gesture. Continuing with the example described above, the gesture engine 410 can execute on a processor 101 and generate a signal that emulates a tactile based user input device. In this example embodiment the gesture library 430 can be used in generating the tactile based user input device command.

Continuing with the description of FIG. 5, operation 504 shows generating a command for a tactile based user input device based on the identified gesture. Continuing with the example described above, the gesture engine 410 can execute on a processor 101 and generate a signal that emulates a tactile based user input device. In this example embodiment the gesture library 430 can be used in generating the tactile based user input device command.

Operation 506 shows sending the command to a gesture unaware program configured to process the command. For example, and in addition to the previous example, the gesture engine 410 can send the command for the tactile based device to the gesture unaware program. In an embodiment the gesture engine 410 can send the command to the unaware program via a device driver. In this example the gesture engine 410 can add the command to a region of memory accessible by the driver and trigger an interrupt directing the driver to run and check the memory. In another embodiment the gesture engine 410 can be configured to include instructions that the drivers would typically include. In this example the gesture engine 410 may send the command directly to the unaware program.

Continuing the specific example from above, the gesture engine 410 can send the packet of information that includes information that identifies how far the "mouse" went can be sent to the mouse driver 412 which can send a mouse message to the program 408 which indicates that the "mouse" moved to the right. In an example embodiment a scaling factor can be applied to the raw movement data so a move of the hand 2 inches moves the mouse cursor half an inch. In another specific example, one where the gesture engine 410 includes driver instructions, the gesture engine 410 can generate a mouse message and send it to the program 408 instead of first generating a packet of information conforming to a mouse protocol.

Figure 6:
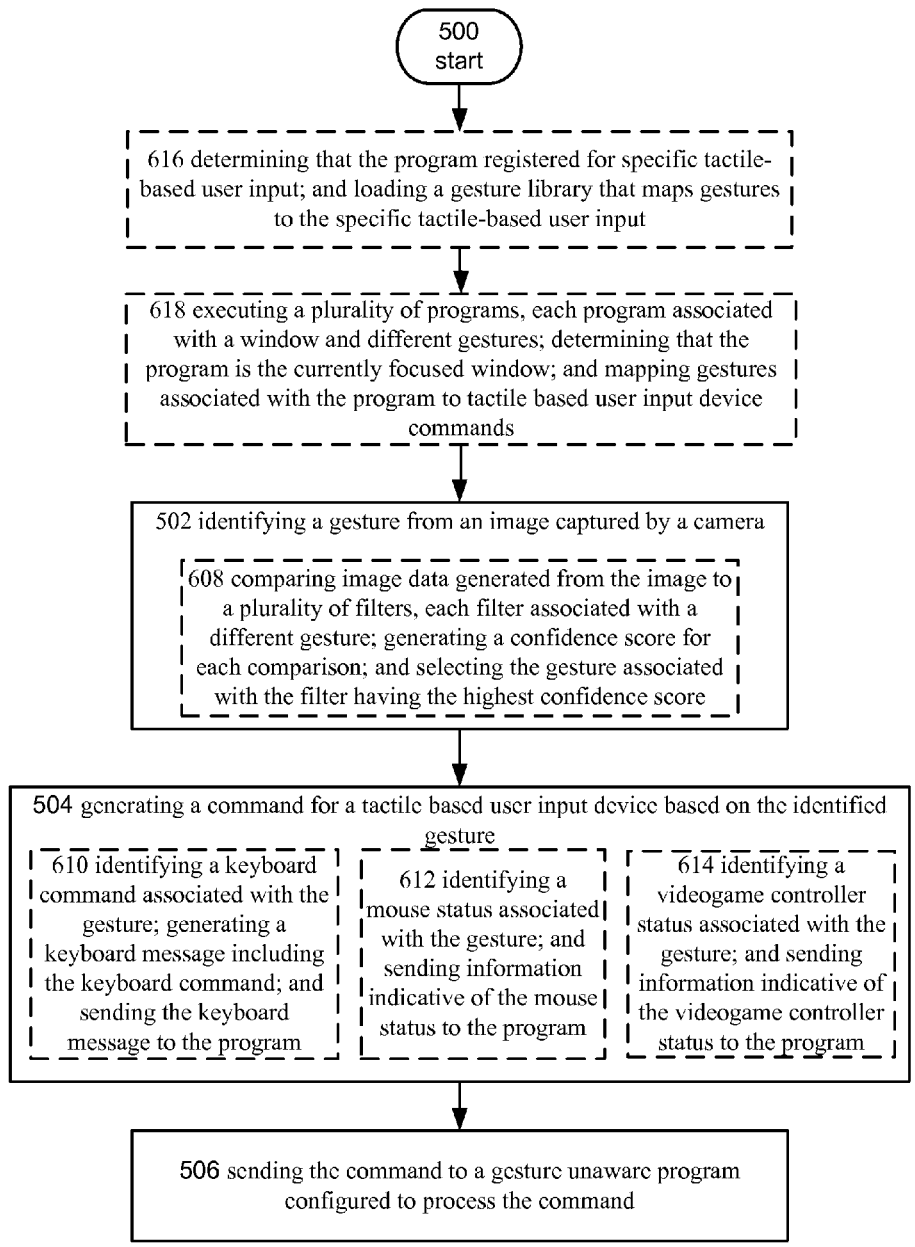
FIG. 6 depicts an alternative embodiment of the operational procedure of FIG. 5.

Turning now to FIG. 6, it illustrates an alternative embodiment of the operational procedure of FIG. 5 including operations 608-620. Turning now to operation 608, it shows comparing image data generated from the image to a plurality of filters, each filter associated with a different gesture; generating a confidence score for each comparison; and selecting the gesture associated with the filter having the highest confidence score. For example, in an example embodiment a confidence score that corresponds to the likelihood that the user's tracked movement corresponds to the gesture can be used to identify gestures in an image. In this example the gesture engine 410 can process image data, e.g., a model created from the image, using a variety of filters in the gesture library 430. A plurality of confidence scores can be generated and the gesture engine 410 can select the filter associated with the highest confidence score.

In a specific example a user may cross both arms in front of his or her chest. A model mirroring the user's posture can be generated and the model can be compared to various filters, e.g., a filter that describes a pose where the arms of the model are crossed in front of the chest, a pose where the arms of the model are crossed over the head, a pose where one arm is crossed in front of the chest, etc. Each point in the model can be compared to corresponding points in the filter and a score can be calculated that reflects how close the model is to the pose. In this specific example the pose where both arms are crossed in front of the chest may have the highest confidence score. Thus, the gesture engine 410 can be configured to select this gesture as the one the user performed.

Continuing with the description of FIG. 6, operation 610 shows identifying a keyboard command associated with the gesture; generating a keyboard message including the keyboard command; and sending the keyboard message to the program. For example, in an embodiment a gesture may be associated with a keyboard command. For example, a gesture of a user bending both of his or her legs and squatting may be mapped to the escape key on a keyboard. In this example the gesture engine 410 could be configured to use the peripheral command library to determine how send for a message that reflects that the escape key was pressed to the program 408 and either generate the message or send, for example, a scancode, to a keyboard driver 414 and have the keyboard driver 414 create the message. The program can then receive the message from a input queue configured to handle keyboard input. The program can then retrieve the message and determine that the escape key was pressed and perform some action.

Turning to operation 612 it shows identifying a mouse status associated with the gesture; and sending information indicative of the mouse status to the program. For example, in an embodiment a detected gesture or gestures may be associated with a right mouse double click and a mouse position. In this example the gesture engine 410 could be configured to use the peripheral command library to determine how send for a message that reflects the position of the mouse along with a mouse double click. In this example the gesture library 430 can be configured to generate a system message that, for example, indicates that the mouse moved or the mouse's position and which button was pressed. In an embodiment where a mouse driver 414 is used, the gesture engine 410 could compose a packet of information that indicates that a mouse event occurred. In this example the packet could be stored in a memory region accessible to the mouse driver 414 and an interrupt could configure the processor 101 to run the mouse driver 414 instructions. The mouse drivers 414 can receive the packet, parse the information, and generate a mouse event message. The mouse event message can then be sent to the program.

Continuing with the description of FIG. 6, operation 614 shows identifying a videogame controller status associated with the gesture; and sending information indicative of the videogame controller status to the program. For example, in an embodiment a detected gesture or gestures may be associated with input from a videogame controller. For example, a controller may have a directional pad, analog sticks and multiple buttons. In this example gestures could be mapped to both the buttons and the analog sticks. In an embodiment the gesture engine 410 could load a gesture library that includes a data structure that maps gestures to videogame controller signals and generate a data structure that would reflect the current state of a videogame controller if one were being used. The data structure could be made available, e.g., placed in a shared memory region and the program 408 could be configured to poll the data structure at predetermined intervals to determine the state of the controller. In an example where a driver is used to communicate information to the program, the gesture engine 410 can generate a message and send it to the driver when a button is pushed. The driver can generate the data structure and interface with the program.

Continuing with the description of FIG. 6, operation 616 shows determining that the program registered for specific tactile-based user input; and loading a gesture library that maps gestures to the specific tactile-based user input. For example, in an embodiment when the program is loaded it can register that it uses certain types of user input. For example, when a program such as a word processor loads it can send a signal to the operating system 222 that identifies that it uses certain types of user input. In this example the gesture engine 410 can receive information that identifies what type of input the program registered for and load a gesture library that maps gestures to the specific type of tactile based user input the program is expecting. For example, the program may register for a videogame controller, mouse, and keyboard input. In this example a gesture library (or three libraries) that includes commands for all three interface types can be loaded.

Operation 618 shows executing a plurality of programs, each program associated with a window and different gestures; determining that the program is the currently focused window; and mapping gestures associated with the program to tactile based user input device commands. For example, in an embodiment a plurality of programs may be executing in execution environment 402. In this example when the focus changes, e.g., the active window changes from one program to another, the gesture library used to control the programs can be changed. In a specific example a gesture aware program such as a videogame, an operating system, and a gesture unaware program such as drawing program may be in memory. In an example when the focus is changed, e.g., the active window switches from the videogame to the operating system desktop, the gesture library for the videogame can be swapped out for the gesture library used to control the desktop.

Figure 7:
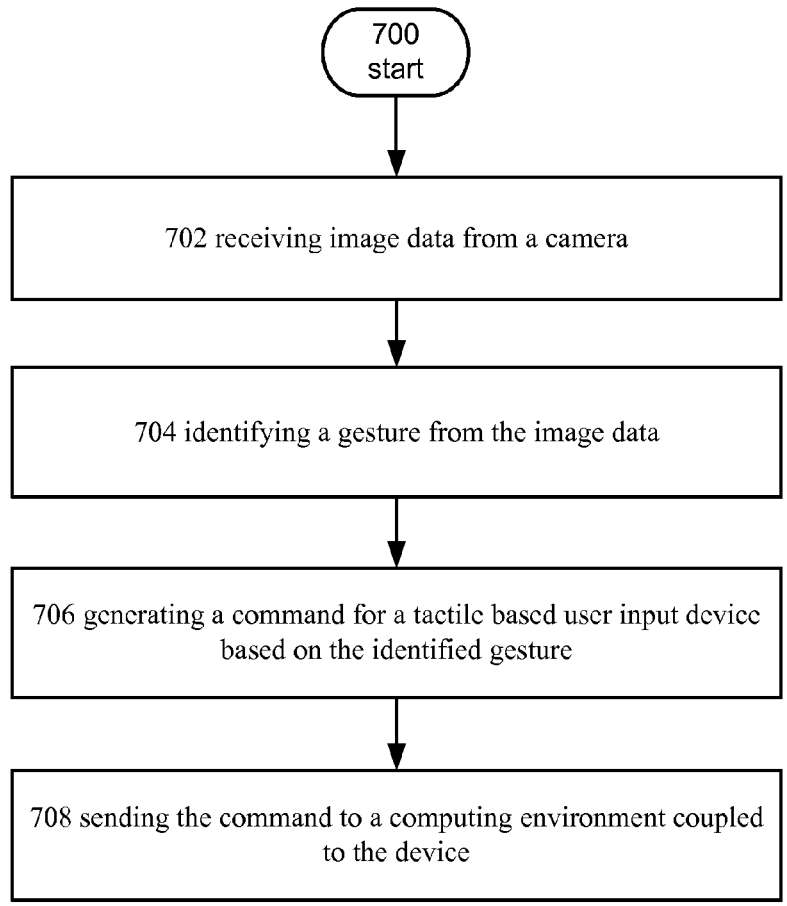
FIG. 7 depicts an operational procedure for practicing aspects of the present disclosure.

Turning now to FIG. 7, it illustrates an operational procedure for practicing aspects of the present disclosure including operations 700-708. Operation 700 begins the operational procedure and operation 702 shows receiving image data from a camera. For example, in an embodiment a capture device 306 including an image camera component 318 can capture an image using one or more components such as an IR light component 320, a three-dimensional (3-D) camera 322, and/or an RGB camera 324.

Turning to operation 704 it shows identifying a gesture from the image data. In an example embodiment a computer readable storage media 112 can store executable instructions for a gesture engine 410 of FIG. 4. In this example the computer readable storage media 112 can be a part of the capture device 306. The gesture engine 410 can execute and parse an image that was captured by an image camera component 318 to determine that the image includes a gesture using techniques described above with respect to FIG. 3.

In a specific example a user may punch with his or her left hand. The capture device 306 can capture multiple images and the gesture engine 410 can generate a model. The model can be compared to various filters in the gesture library 430. A gesture in the library 430 can be matched to the model.

Turning to operation 706, it shows generating a command for a tactile based user input device based on the identified gesture. For example, in an embodiment the gesture engine 410 can generate a signal indicative of a command that a tactile based user input device would generate. For example, in an embodiment a gesture library may map gestures to mice commands and/or keyboard commands. In this example the gesture engine 410 can generate a signal that such a user input device would send to a computer environment over a link such as a wireless or wired link. In this example the gesture library 430 can include information that defines how different peripheral devices send commands and thus can be used to emulate different peripheral devices. For example USB keyboards send scancodes and USB mice send 3 to 5 byte packets depending on the type of mouse.

Continuing with the description of FIG. 7, operation 708 shows sending the command to a computing environment coupled to the device. For example, once a command is generated by the gesture engine 410 it can be sent to the computing environment 402 via link 434. In this example embodiment an appropriate driver, e.g., mouse driver 412, keyboard driver 414, or some other type of I/O driver 416 can receive the command. For example, if the gesture engine 410 generates a mouse command the command can be routed to the mouse driver 412.

Figure 8:
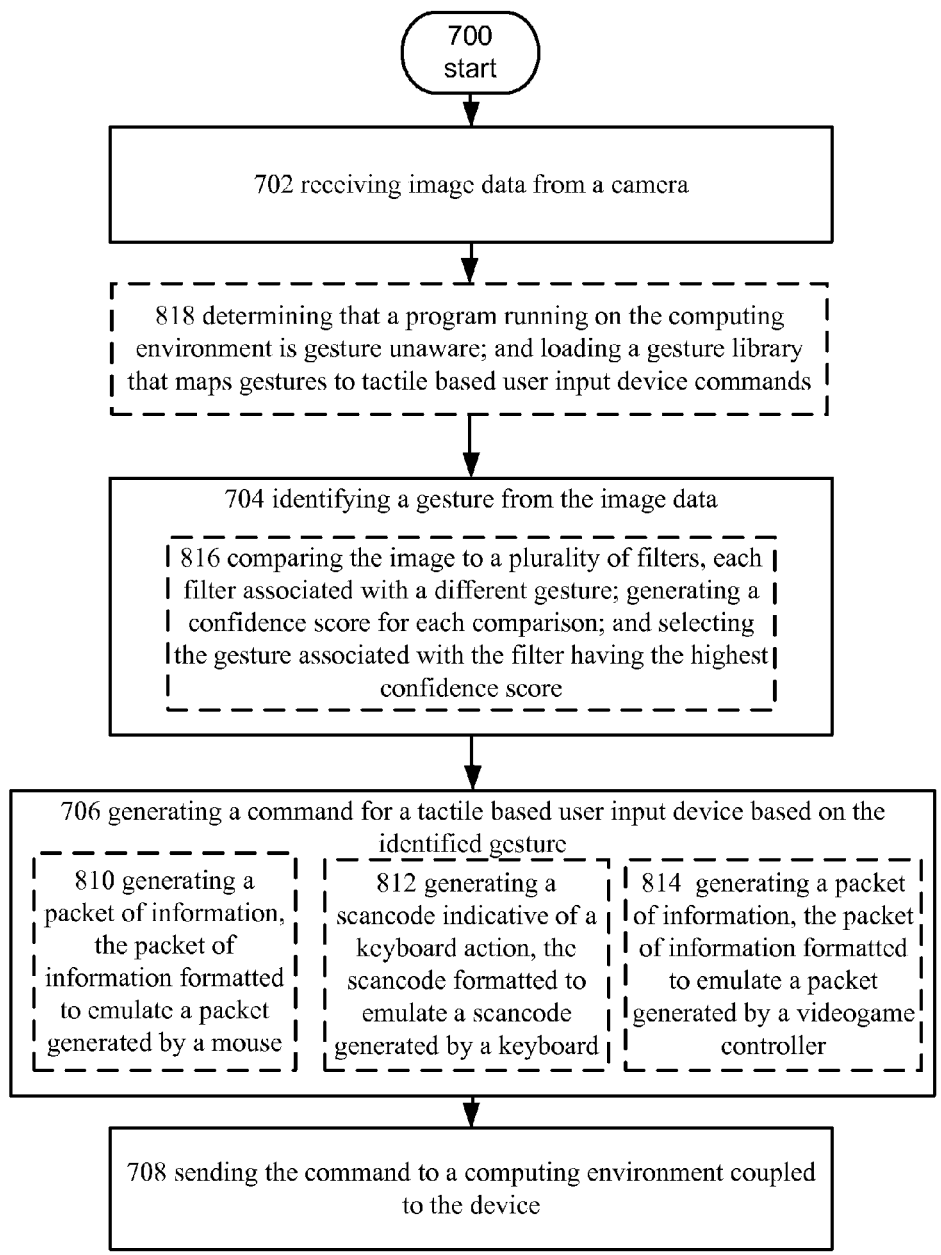
FIG. 8 depicts an alternative embodiment of the operational procedure of FIG. 7.

Turning now to FIG. 8, it illustrates an alternative embodiment of the operational procedure of FIG. 7 including operations 810-818. Operation 810 shows generating a packet of information, the packet of information formatted to emulate a packet generated by a mouse. In an example embodiment generating a command can include generating a mouse command. For example, in an embodiment a detected gesture or gestures may be associated with a right mouse double click and a mouse position. In this example the gesture engine 410 could generate a message that reflects the position of the mouse along with a mouse double click. In this example the gesture library 430 can be configured to generate a system message that, for example, indicates that the mouse moved or the mouse's position and which button was pressed. In this example the capture device 306 could send a packet of information that indicates that a mouse event occurred. In this example the packet could be stored in a memory region accessible to the mouse driver 414 and an interrupt could configure the processor 101 to run the mouse driver 414 instructions. The mouse driver 414 can receive the packet, parse the information, and generate a mouse event message. The mouse event message can then be sent to the program.

Continuing with the description of FIG. 8, operation 812 shows generating a scancode indicative of a keyboard action, the scancode formatted to emulate a scancode generated by a keyboard. In an example embodiment generating a command can include generating a keyboard command. For example, a gesture of a user moving his or her hand out to the left may be mapped to the left arrow key. In this example the gesture engine 410 could be configured to use the gesture library 430 to generate a message that reflects that the escape key was pressed to the program 408 and send a scancode associated with the left arrow key to the computing environment 402 via the link 434. The keyboard driver 414 can create a message and send it to the program.

Turning to operation 814 it shows generating a packet of information, the packet of information formatted to emulate a packet generated by a videogame controller. For example, a controller may have a directional pad, analog sticks and multiple buttons. In this example gestures could be mapped to both the buttons and the analog sticks. In an embodiment the gesture engine 410 could be configured to use the gesture library 430 to generate a packet of information that identifies when a button or analog stick has been activated. The packet can be sent to the computing environment 402 via the link 434 and a controller driver can run. The controller driver can store the command in a data structure that can be polled by the program at predetermined intervals.

Continuing with the description of FIG. 8, operation 816 shows comparing the image to a plurality of filters, each filter associated with a different gesture; generating a confidence score for each comparison; and selecting the gesture associated with the filter having the highest confidence score. For example, in an example embodiment a confidence score that corresponds to the likelihood that the user's tracked movement corresponds to the gesture can be used to identify gestures in an image. In this example the gesture engine 410 can process image data, e.g., a model created from the image, through a variety of filters in the gesture library 430. A plurality of confidence scores can be generated and the gesture engine 410 can select the filter associated with the highest confidence score.

Turning to operation 818 it shows determining that a program running on the computing environment is gesture unaware; and loading a gesture library that maps gestures to tactile based user input device commands. In an embodiment of the present disclosure the capture device 306 can be configured to determine when a gesture unaware program is running and load a gesture library to map gestures to user interface actions that can control the program. For example, when the capture device 306 is connected it can communicate with the computing environment 402 to determine whether any programs have registered for gesture input. If no programs have registered for input it can configure itself to operate with gesture unaware programs. In another embodiment the gesture engine 410 could be distributed across both the capture device 406 and the execution environment 402 or a capture device driver could execute on the execution environment 402. The gesture engine 410 or capture device driver on the execution environment 402 could be configured to report what programs are loaded into memory to the capture device 306. In the event that programs only register for tactile based device generated user input then the gesture library 430 can be loaded.

The foregoing detailed description has set forth various embodiments of the systems and/or processes via examples and/or operational diagrams. Insofar as such block diagrams, and/or examples contain one or more functions and/or operations, it will be understood by those within the art that each function and/or operation within such block diagrams, or examples can be implemented, individually and/or collectively, by a wide range of hardware, software, firmware, or virtually any combination thereof.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

What is claimed is:

1. A computer readable hardware device, including executable instructions, the computer readable storage device comprising:
   instructions for receiving first image data from a camera, the first image data representing a user motion or pose;
   instructions for, in response to determining that a first application is configured to process gesture data, sending the first application an output indicative of whether the user motion or pose is indicative of performing a gesture;
   instructions for receiving second image data, the second image data representing a user motion or pose;
   instructions for, before a second application has received an indication of the second image data, and in response to determining that the second application is not configured to process gesture data, and in response to changing input focus to the second application that is not configured to process gesture data, replacing a first gesture library with a second gesture library that outputs tactile based user commands and using the second gesture library to generate a command for a tactile based user input device based on the second image data, the second gesture library being configured to send tactile based user commands to a plurality of applications that includes the second application; and
   instructions for sending the command generated using the second gesture library to the second application.

2. The computer readable hardware device of claim 1, wherein the instructions for, in response to determining that the first application is configured to process gesture data, sending the first application the output indicative of whether the user motion or pose further comprise:
   instructions for sending the first application an indication of a confidence level that the user motion or pose corresponds to performing a gesture.

3. The computer readable hardware device of claim 1, wherein the instructions for generating the command further comprise:
   instructions for identifying a keyboard command associated with the motion or pose;
   instructions for generating a keyboard message including the keyboard command; and
   instructions for sending the keyboard message to the second application.

4. The computer readable hardware device of claim 1, wherein the instructions for generating the command further comprise:
   instructions for identifying a mouse status associated with the motion or pose; and
   instructions for sending information indicative of the mouse status to the second application.

5. The computer readable hardware device of claim 1, wherein the instructions for generating the command further comprise:
   instructions for identifying a videogame controller status associated with the motion or pose; and
   instructions for sending information indicative of the videogame controller status to the second application.

6. The computer readable hardware device of claim 1, further comprising:
   instructions for determining that the second application registered for specific tactile-based user input; and
   instructions for loading a gesture library that maps gestures to the specific tactile-based user input.

7. The computer readable hardware device of claim 1, wherein the instructions for, in response to determining that a first application is configured to process gesture data, sending the first application an output indicative of whether the user motion or pose; further comprise:
   instructions for sending the first application the output in response to determining that the first application has the currently focused window.

8. A method, comprising:
   receiving first image data from a camera, the first image data representing a user motion or pose;
   in response to determining that a first application is configured to process gesture data, sending the first application an output indicative of whether the user motion or pose is indicative of performing a gesture;
   receiving second image data, the second image data representing a user motion or pose;
   before a second application has received an indication of the second image data, in response to determining that the second application is not configured to process gesture data, and in response to changing input focus to the second application that is not configured to process gesture data, replacing a first gesture library with a second gesture library that outputs tactile based user commands and using the second gesture library to generate a command for a tactile based user input device based on the second image data, the second gesture library being configured to send tactile based user commands to a plurality of applications that includes the second application; and
   sending the command to the second application.

9. The method of claim 8, wherein generating the command further comprises:
   generating a packet of information, the packet of information formatted to emulate a packet generated by a mouse.

10. The method of claim 8, wherein generating the command further comprises:
    generating a scancode indicative of a keyboard action, the scancode formatted to emulate a scancode generated by a keyboard.

11. The method of claim 8, wherein generating the command further comprises:
    generating a packet of information, the packet of information formatted to emulate a packet generated by a videogame controller.

12. The method of claim 8, wherein in response to determining that the first application is configured to process gesture data, sending the first application the output indicative of whether the user motion or pose further comprises:
    sending the first application an indication of a confidence level that the user motion or pose corresponds to performing a gesture.

13. The method of claim 8, further comprising:
    in response to determining that the second application is not configured to process gesture data, loading a gesture library that maps gestures to tactile based user input device commands; and
    wherein generating the command for the tactile based user input device based on the second image data comprises:
        determining the command based on using the second image data as input to the gesture library.

14. A system, comprising:
    a processor; and
    a memory communicatively coupled to the processor when the system is operational, the memory bearing processor-executable instructions that, when executed on the processor, cause the system at least to:
        receive first image data from a camera, the first image data representing a user motion or pose;

in response to determining that a first application is configured to process gesture data, using a first gesture library that outputs gesture data to send the first application an output indicative of whether the user motion or pose is indicative of performing a gesture;

receive second image data, the second image data representing a user motion or pose;

before a second application has received an indication of the second image data, and in response to changing input focus to the second application that is not configured to process gesture data, replacing the first gesture library with a second gesture library that outputs tactile based user commands and using the second gesture library to generate a command for a tactile based user input device based on the second image data, the second gesture library being configured to send tactile based user commands to a plurality of applications that includes the second application; and send the command to the second application.

15. The system of claim 14, wherein the processor-executable instructions that, when executed on the processor, cause the system at least to generate a command for a tactile based user input device based on the second image data further cause the system at least to:

generate scancodes for keys of keyboards.

16. The system of claim 14, wherein the processor-executable instructions that, when executed on the processor, cause the system at least to generate a command for a tactile based user input device based on the second image data further cause the system at least to:

generate packets that include mouse button state and mouse position information.

17. The system of claim 14, wherein the processor-executable instructions that, when executed on the processor, cause the system at least to generate a command for a tactile based user input device based on the second image data further cause the system at least to:

generate state information for a videogame controller.

18. The system of claim 14, wherein the processor-executable instructions that, when executed on the processor, cause the system at least to generate a command for a tactile based user input device based on the second image data further cause the system at least to:

generate keyboard messages.

19. The system of claim 14, wherein the processor-executable instructions that, when executed on the processor, cause the system at least to generate a command for a tactile based user input device based on the second image data further cause the system at least to:

generate mouse messages.

* * * * *